United States Patent [19]
Kori et al.

[11] Patent Number: 5,914,754
[45] Date of Patent: Jun. 22, 1999

[54] VIDEO SIGNAL ASPECT RATIO CONVERSION APPARATUS

[75] Inventors: Teruhiko Kori, Kanagawa; Tadashi Ezaki; Jun Hirai, both of Tokyo, all of Japan

[73] Assignee: Sony Corporation, Tokyo, Japan

[21] Appl. No.: 08/566,152

[22] Filed: Dec. 1, 1995

[30] Foreign Application Priority Data

Dec. 6, 1994 [JP] Japan .................................. 6-330032

[51] Int. Cl.⁶ .......................... H04N 7/01; H04N 11/20
[52] U.S. Cl. ....................... 348/455; 348/556; 348/555
[58] Field of Search .................................. 348/445, 556, 348/913, 555, 561, 562; H04N 7/01, 11/20, 11/22

[56] References Cited

U.S. PATENT DOCUMENTS

| | | | |
|---|---|---|---|
| 4,953,025 | 8/1990 | Saitoh et al. | 358/140 |
| 5,070,395 | 12/1991 | Kitaura | 348/445 |
| 5,107,254 | 4/1992 | Choi | 348/561 |
| 5,159,438 | 10/1992 | Rabii | 348/445 |
| 5,181,110 | 1/1993 | Katsumata et al. | 348/561 |
| 5,303,044 | 4/1994 | Richards | 348/445 |
| 5,343,238 | 8/1994 | Takata et al. | 348/561 |
| 5,347,318 | 9/1994 | Kobayashi | 348/445 |
| 5,400,077 | 3/1995 | Cookson | 348/445 |
| 5,444,492 | 8/1995 | Kihara | 348/445 |
| 5,502,486 | 3/1996 | Ueda et al. | 348/561 |

Primary Examiner—Nathan Flynn
Assistant Examiner—Vivek Srivastava
Attorney, Agent, or Firm—Frommer Lawrence & Haug, LLP; William S. Frommer

[57] ABSTRACT

An aspect ratio converter converts the input aspect ratio of an input video signal to an output aspect ratio. The input video signal contains partial area information representing a portion of the input video signal which constitutes substantially all of the video picture with the desired output aspect ratio. The input video signal is stored in an addressable memory and is read out from those addresses corresponding to the partial area of the input video signal.

17 Claims, 17 Drawing Sheets

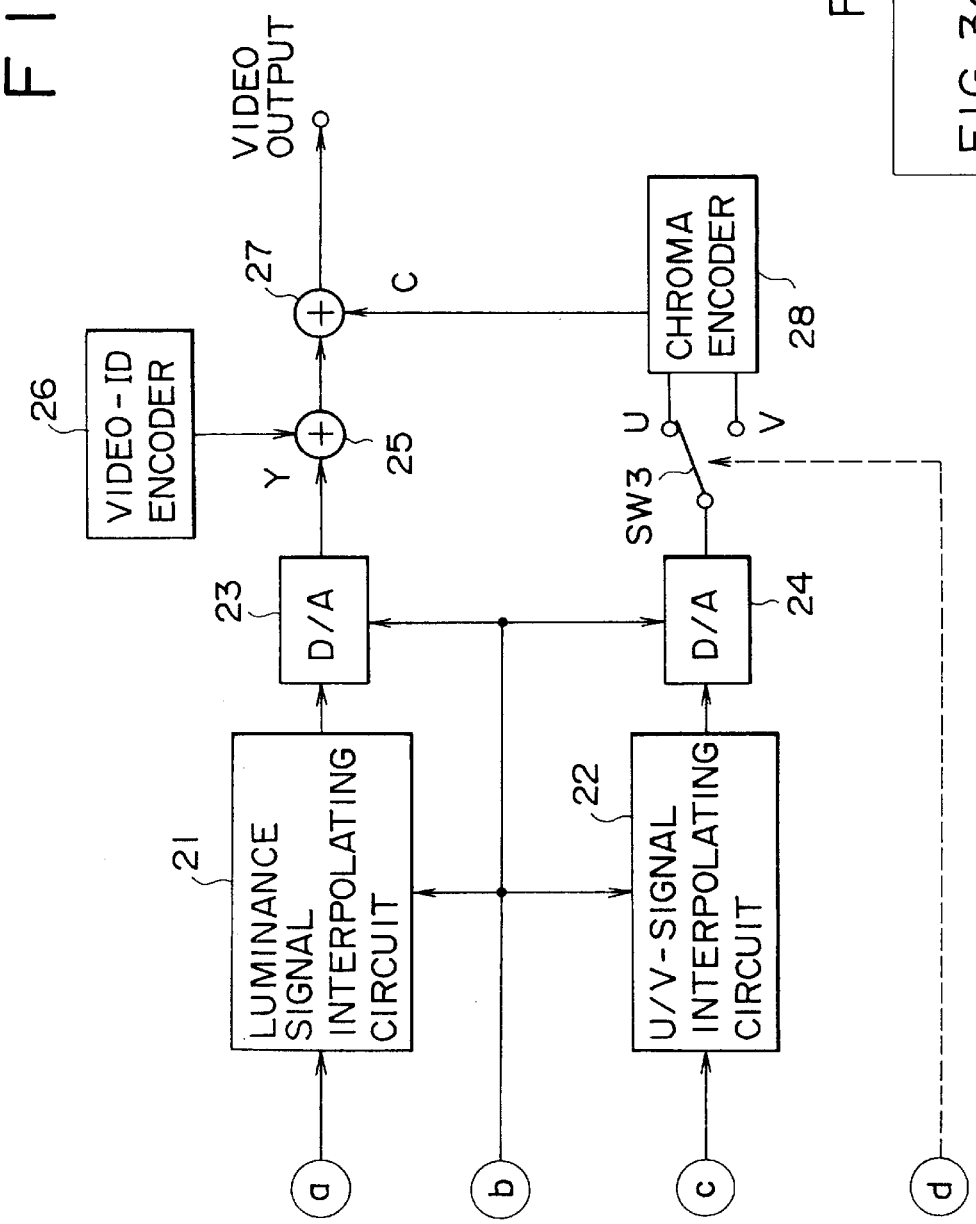

FIG. 4
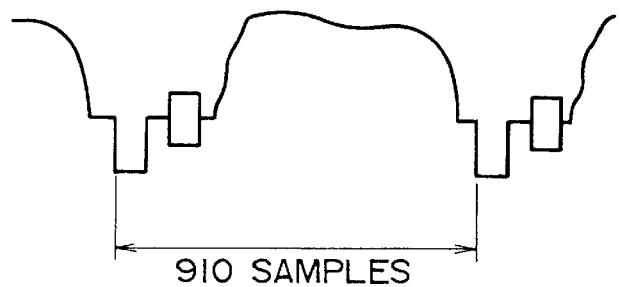
FIG. 5d
PICTURE OF FULL-MODE IMAGE SOURCE
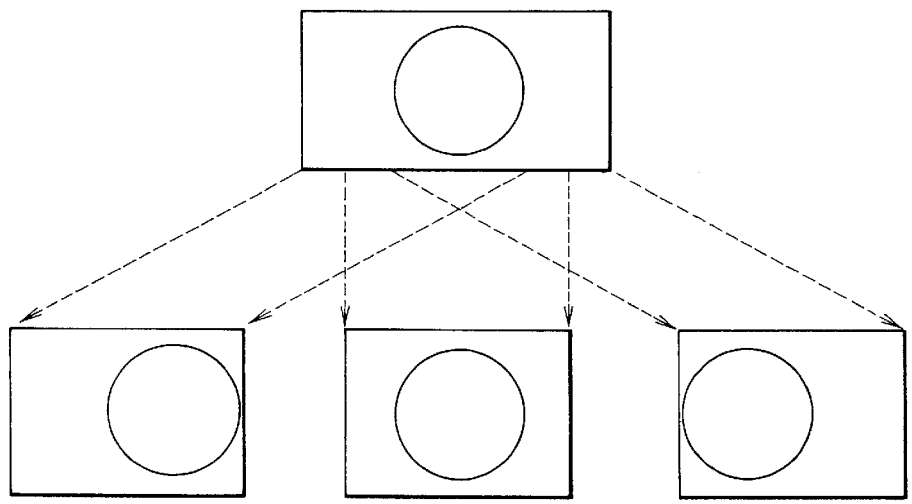
PICTURE DISPLAYED IN A 4:3 TELEVISION
LEFT            MIDDLE          RIGHT
FIG. 5a      FIG. 5b      FIG. 5c FIG. 6a LEFT
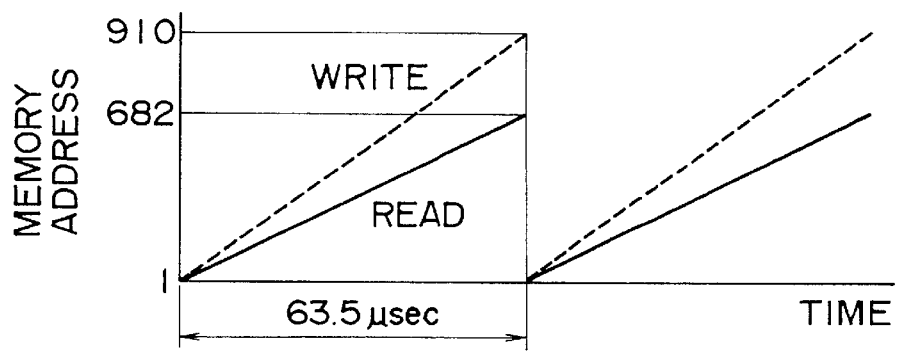
FIG. 6b MIDDLE
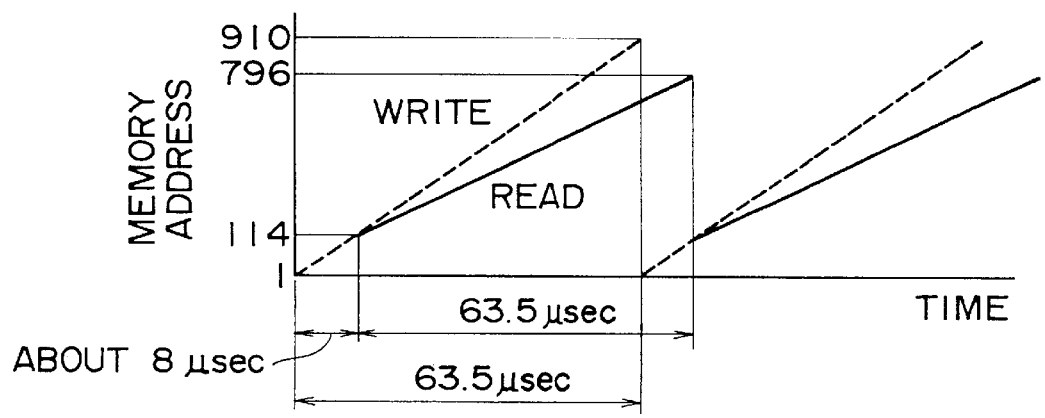
FIG. 6c RIGHT
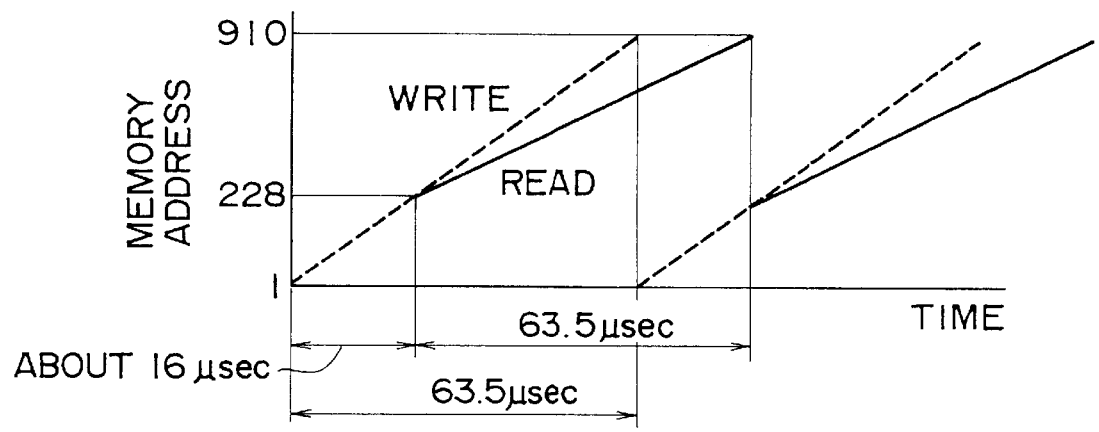

16:9 ORIGINAL PICTURE
(ENCLOSED BY DASHED LINES)

4:3 DISPLAY AREA
(ENCLOSED BY
SOLID LINES)

0 1 ... 15

HORIZONTAL DISPLAY
POSITION (4 bits)

VERTICAL
DISPLAY
POSITION
(4 bits)

4:3 ORIGINAL PICTURE
(ENCLOSED BY DASHED LINES)

16:9 DISPLAY AREA
(ENCLOSED BY SOLID
LINES)

FIG. 12c

| bit PATTERN | CONTENTS TRANSMITTED IN WORD 2 |
|---|---|
| 0000 | NOT DEFINED |
| 0001 | RECORDING DATE (YEAR, MONTH, DAY, AND DAY OF THE WEEK) |
| 0010 | RECORDING TIME (HOUR, MINUTE AND SECOND) |
| 0011 | INFORMATION ADDED TO THE IMAGE SIGNAL (1) |
| 0100 | INFORMATION ADDED TO THE IMAGE SIGNAL (2) |
| 0101 | SOURCE INFORMATION |
| 0110 | GENRE AND CATEGORY |
| 0111 | NOT DEFINED (MEDIA A) |
| 1000 | NOT DEFINED (MEDIA B) |
| 1001 | NOT DEFINED (MEDIA C) |
| 1010 | NOT DEFINED (MEDIA D) |
| 1011 | NOT DEFINED |
| 1100 | CHARACTER HEADER |
| 1101 | CHARACTER DATA |
| 1110 | CHARACTER TERMINATOR |
| 1111 | NOT DEFINED |

(bit PATTERN column = WORD 1)

FIG. 13

| WORD 1 | | | WORD 2 | | |
|---|---|---|---|---|---|
| bit 3 | bit 6 | bit 7 | bit 10 | bit 11 | bit 14 |
| 0 | 1 0 0 | HORIZONTAL-DIRECTION POSITION SPECIFICATION (4 bits) | | VERTICAL-DIRECTION POSITION SPECIFICATION (4 bits) | |

FIG. 14

| WORD 1 | | | | | WORD 2 | | | | | |
|---|---|---|---|---|---|---|---|---|---|---|
| bit 3 | bit 4 | bit 5 | bit 6 | bit 7 | bit 8 | bit 9 | bit 10 | bit 11 | bit 12 | bit 13 bit 14 |
| 0 | 1 | 0 | 0 | | | CAPTION POSITION | | HORIZONTAL-DIRECTION POSITION SPECIFICATION | | VERTICAL-DIRECTION POSITION SPECIFICATION |

NOT DEFINED | SCREEN SIZE bit 7 : RESERVED bit 8 : 0 = 16:9, 1 = CINESCO bits 9 AND 10 : 00 = NO CAPTION, 01 = NO UPPER PICTURE PORTION
10 = NO LOWER PICTURE PORTION, 11 = INSIDE THE PICTURE bits 11 AND 12 : 00 = NOT DEFINED, 01 = LEFT SIDE
10 = MIDDLE, 11 = RIGHT SIDE bits 13 AND 14 : 00 = NOT DEFINED, 01 = UPPER SIDE
10 = MIDDLE, 11 = LOWER SIDE

F I G. 15

| WORD 1 | | | | WORD 2 | | | | | |
|---|---|---|---|---|---|---|---|---|---|
| bit 3 | bit 4 | bit 5 | bit 6 | bit 7 | bit 8 | bit 9 | bit 10 | bit 11 bit 12 bit 13 bit 14 | |
| 0 | 1 | 0 | 0 | 0 | DISTANCE (X1) | | | HORIZONTAL-DIRECTION POSITION SPECIFICATION (X0) | |
| | | | | 1 | DISTANCE (Y1) | | | VERTICAL-DIRECTION POSITION SPECIFICATION (Y0) | |

4:3 TV

WIDE TV

TRANSMITTED PICTURE (NTSC)

ORIGINAL PICTURE (16:9)

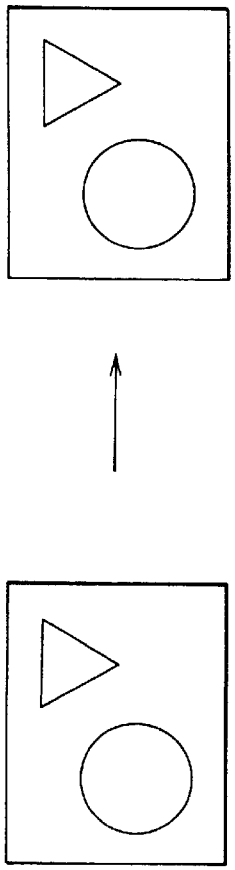
FIG. 17a ORIGINAL PICTURE (4:3)
FIG. 17b TRANSMITTED PICTURE (NTSC)
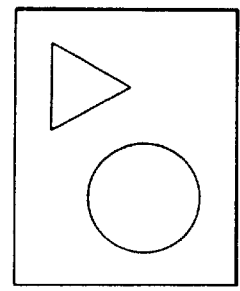
FIG. 17c 4:3 TV
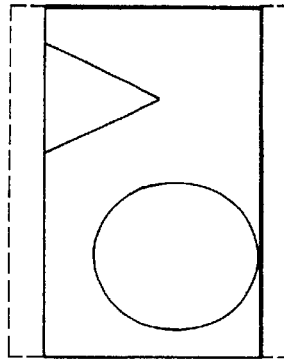
FIG. 17d WIDE TV
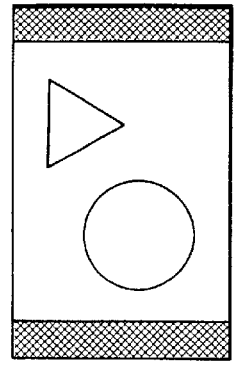
FIG. 17e WIDE TV

4:3 TV

WIDE TV

TRANSMITTED PICTURE (NTSC)

ORIGINAL PICTURE (16:9)

VIDEO SIGNAL ASPECT RATIO CONVERSION APPARATUS

BACKGROUND OF THE INVENTION

The present invention relates to video signal aspect conversion for converting the aspect ratio of a video picture and, more particularly, to converting the aspect ratio in accordance with an identification signal added to the video picture.

A video picture has an aspect ratio, which is the ratio of the width to the height of the picture. The aspect ratio varies according to different video picture systems. Television receivers employing the NTSC System, for example, produce a video picture with an aspect ratio of 4:3. Thus, the display screen is substantially square, the width being only 1.34 times greater than the height.

By comparison, a typical movie picture has an aspect ratio of 16:9, which is rectangular and has a significantly greater width to height ratio than the NTSC system. This movie picture is known as a wide screen picture and is much more optically pleasing than the substantially square 4:3 video picture because people normally perceive their surroundings with a greater sense of width than height.

Recently, televisions having a wide display screen, i.e., 16:9, aspect ratio have been produced so that people can watch video recorded movies in the comfort of their own home with all the enjoyment of watching the movie in a movie theater. These wide-screen televisions receive wide-screen video signals, just as the NTSC system televisions receive so-called 4:3 video signals.

A problem arises, however, when a NTSC 4:3 television receives a wide-screen 16:9 video signal because the number of horizontal lines of a wide-screen video signal does not correspond to the number of horizontal lines of the NTSC television. A wide-screen video signal has 360 horizontal lines, whereas the NTSC video signal has 525 horizontal lines. As a result, if a wide-screen video picture is displayed on a NTSC television, upper and lower portions of the video picture, as shown in FIG. 16c, are blank. This configuration is visually unappealing because it appears "squashed" to an observer and the left and right portions of the wide-screen picture are cut off. This is a particular problem when the cut-off portions include important picture information; and as a result, the viewer does not perceive an important part of the video picture.

Similarly, if a 4:3 video picture is displayed on a 16:9 wide-screen television, left and right portions of the video picture are blank. This is because the 4:3 video picture has a smaller width than the width of the wide-screen television. Similar to the case of the wide-screen video picture displayed on an NTSC television, the top and bottom portions of the original picture are cut off in the 4:3 television as shown in FIG. 17d.

Another problem associated with displaying a 16:9 wide-screen video signal on a 4:3 television is that the vertical resolution of the displayed picture is reduced. This is because the number of effective scanning lines in the vertical direction for a wide-screen video signal is 360 and the number of scanning lines for a 4:3 television is 525. Even if the number of scanning lines of the wide-screen video signal is increased to about 480 by means of an interpolation process, it still is not possible to obtain the same vertical resolution of the original picture. This is because the wide-screen video signal would be produced by decimating a video signal of 480 lines to 360 lines and some of the vertical resolution is lost in the process.

A technique proposed to fit a wide-screen video signal on a 4:3 television is shown by FIGS. 18a–d. The original picture shown in FIG. 18a is vertically stretched into the NTSC video picture shown in FIG. 18b. However, the resulting vertically stretched picture appears abnormal to an observer and is, therefore, not desirable.

OBJECTS OF THE INVENTION

Therefore, it is an object of the present invention to provide a video-signal aspect ratio conversion apparatus that allows a wide-screen picture to be transmitted in NTSC format without creating blank portions.

Another object of the present invention is to provide a video signal aspect ratio conversion apparatus that allows a wide-screen video picture to be transmitted to and displayed by a 4:3 television without deforming the shape of the original picture.

A further object of the present invention is to provide a video-picture aspect conversion apparatus which variably specifies a partial area of the original picture that can be displayed.

Other objects, features, and advantages of the present invention will become apparent from the following detailed description.

SUMMARY OF THE INVENTION

In accordance with the above objects, the present invention is embodied as a video signal aspect ratio conversion apparatus in which a decoder retrieves from the input video signal, an identification signal which includes partial area information of the input video signal. A memory stores the input video signal and a read-address generator outputs an address to the memory corresponding to the partial area information included in the retrieved identification signal, causing the partial area information to be output as the output video signal.

BRIEF DESCRIPTION OF THE DRAWINGS

A more complete appreciation of the present invention and many of its attendant advantages will be readily obtained by reference to the following detailed description considered in connection with the accompanying drawings, in which:

FIGS. 3a & 3b are block diagrams which show a configuration for carrying out aspect conversion in accordance with the present invention;

FIG. 4 is a diagram showing a sampling operation of the A/D converter shown in FIG. 3a;

FIGS. 5a to 5d are diagrams showing partial areas selected in the horizontal direction of a picture when displaying a full-mode image source in a 4:3 television;

FIGS. 6a to 6c are diagrams showing write and read addresses of memory corresponding to selected partial areas of FIGS. 5a to 5c in the horizontal direction;

FIG. 13 is a diagram showing an example of allocating pieces of information for specifying positions in the horizontal and vertical directions in accordance with the identification code shown in FIGS. 12a to 12c;

FIG. 14 is a diagram showing another example of allocating pieces of information for specifying positions in the horizontal and vertical directions in accordance with the identification code shown in FIGS. 12a to 12c;

FIG. 15 is a diagram showing an example of allocating pieces of information for specifying an enlarged display partial area in accordance with the identification code shown in FIGS. 12a to 12c;

FIGS. 17a to 17e are diagrams showing a transmitted 4:3 picture to be displayed on a 4:3 or 16:9 wide television.

DETAILED DESCRIPTION OF THE PREFERRED EMBODIMENTS

Figure 1:
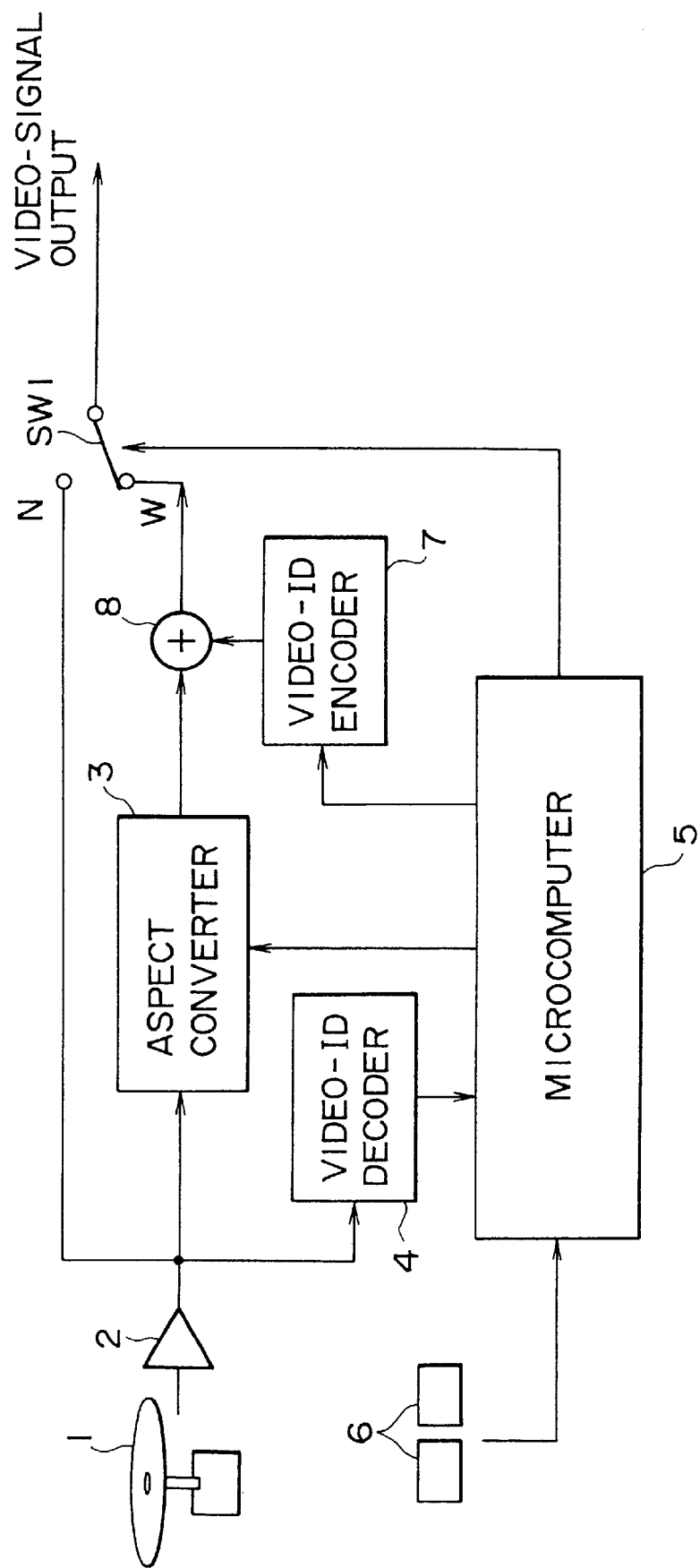
FIG. 1 is a block diagram showing the configuration of a video-signal aspect ratio conversion apparatus in accordance with the present invention.

Referring now to the drawings, wherein like reference numerals designate identical or corresponding parts throughout the several views, the video-signal playback apparatus of the present invention will be described with reference to FIG. 1.

A video signal is reproduced from a recording medium 1, such as a video disk. The video signal is composed of a vertical blanking section and a video data section. The vertical blanking section is used by the television (not shown) to turn the electron beam off while the electron beam controller resets the position of the electron beam to the upper left corner. The video data section, by contrast, includes data which makes up the video picture.

The vertical blanking section also carries an identification signal, which preferably includes the aspect ratio information of the video signal. With the aspect ratio information, the proper aspect ratio is selected by the television during broadcast of the video picture. The identification signal also preferably includes information for selecting a partial area of the input video picture to be displayed when the input video picture is converted to a different aspect ratio. For example, if the input video picture has a 16:9 aspect ratio, the partial area with a 4:3 aspect ratio is "cut" from the input video picture. In addition, the identification signal may also include such information as genre, recording date and time, category and copy limitations.

The input video signal is amplified by a playback amplifier 2 and output to a switch SW1, an aspect converter 3 and a video-ID decoder 4. The switch setting of switch SW1 determines whether the reproduced video signal or the converted video signal is output to the television. The N terminal outputs the unconverted video signal, while the W terminal outputs the converted video signal.

The switch SW1 is controlled by a microcomputer 5 which is adapted to determine if the aspect ratios of the input video signal and the television (not shown) coupled thereto coincide, so as to connect switch SW1 to terminal N, whereupon the video signal output by the playback amplifier 2 is output directly to the television. An aspect-conversion switch 6 acts as a breaker and, when the aspect-conversion switch 6 is turned off by an operator, switch SW1 will always be connected to the N terminal. On the other hand, if the microcomputer 5 determines that the aspect ratio of the video signal does not correspond to the aspect ratio of the television and if the aspect-conversion switch 6 is turned on by an operator, the switch SW1 is connected to the W terminal and the aspect-converted signal is output.

The aspect converter 3 converts the aspect ratio of the video signal to the aspect ratio of the television (as discussed below with reference to FIG. 3). Video-ID decoder 4 decodes the identification signal included in the vertical blanking section of the video signal and supplies the aspect ratio information to the microcomputer 5. The microcomputer 5 then controls the aspect converter 3 as a function of the aspect ratio information in the identification signal. The identification signal is then rewritten by a video-ID encoder 7 and output to an adder 8 which combines the converted video signal with the rewritten identification signal and the resulting video signal is output to terminal W of switch SW1.

Figure 2:
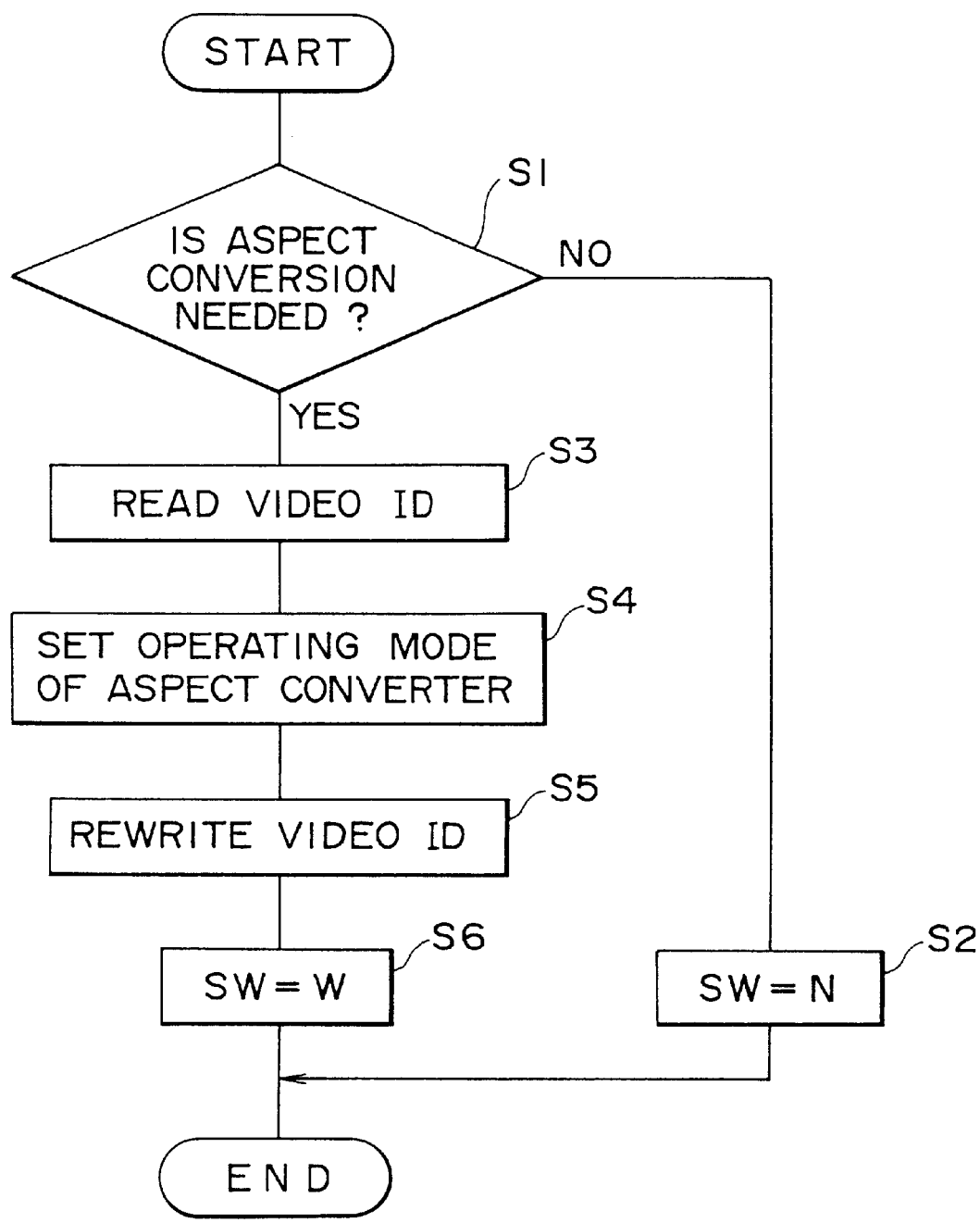
FIG. 2 is a flowchart representing operations of the video-signal aspect ratio conversion apparatus in accordance with the present invention.

An example of the operation of the video-signal playback apparatus will now be set forth with reference to the flow chart of FIG. 2. At the start of the operation, a video signal is reproduced from a video disk 1 and amplified by the playback amplifier 2.

The microcomputer 5 determines whether aspect conversion is necessary in step S1 when two conditions are satisfied: (1) when an operator decides that the aspect ratio of the video picture is to be converted and turns on the aspect-conversion switch 6; and (2) when the microcomputer 5 determines that the aspect ratios of the input video signal and the television (not shown) do not correspond. For example, the second condition is satisfied when the microcomputer 5 determines that the input video signal has an aspect ratio of 4:3 and the television (not shown) has an aspect ratio of 16:9. When the aforenoted two conditions are satisfied, the converted video signal is output from aspect converter 3. If aspect conversion is not necessary, the switch SW1 is set to terminal N in step S2 and the input video signal is output directly (i.e. as is) to the television.

If it is determined that aspect conversion is needed, video-ID decoder 4 retrieves the identification signal in step S3 from the amplified video signal and outputs the aspect ratio information to microcomputer 5. The microcomputer sets the aspect conversion ratio, for example, from the input aspect ratio of 4:3 to the output aspect ratio of 16:9. The aspect converter 3 converts the 4:3 aspect ratio of the video signal to the 16:9 aspect ratio of the television (not shown) in step S4. In step S5, the video ID signal is rewritten, and, in step S6, the switch SW1 is switched to W. The adder 8 then combines the converted video signal with the rewritten identification signal and the resulting signal is output through terminal W to the 16:9 television.

The identification signal is rewritten in step S5 because the television may not recognize that the video signal has been converted. In that instance, the television may perform one of the conventional aspect conversion processes on the video signal. To prevent the television from converting the video signal a second time, the present invention rewrites the identification signal, from which the television determines that the video signal has already been converted, and will not perform another conversion.

Figure 3A:
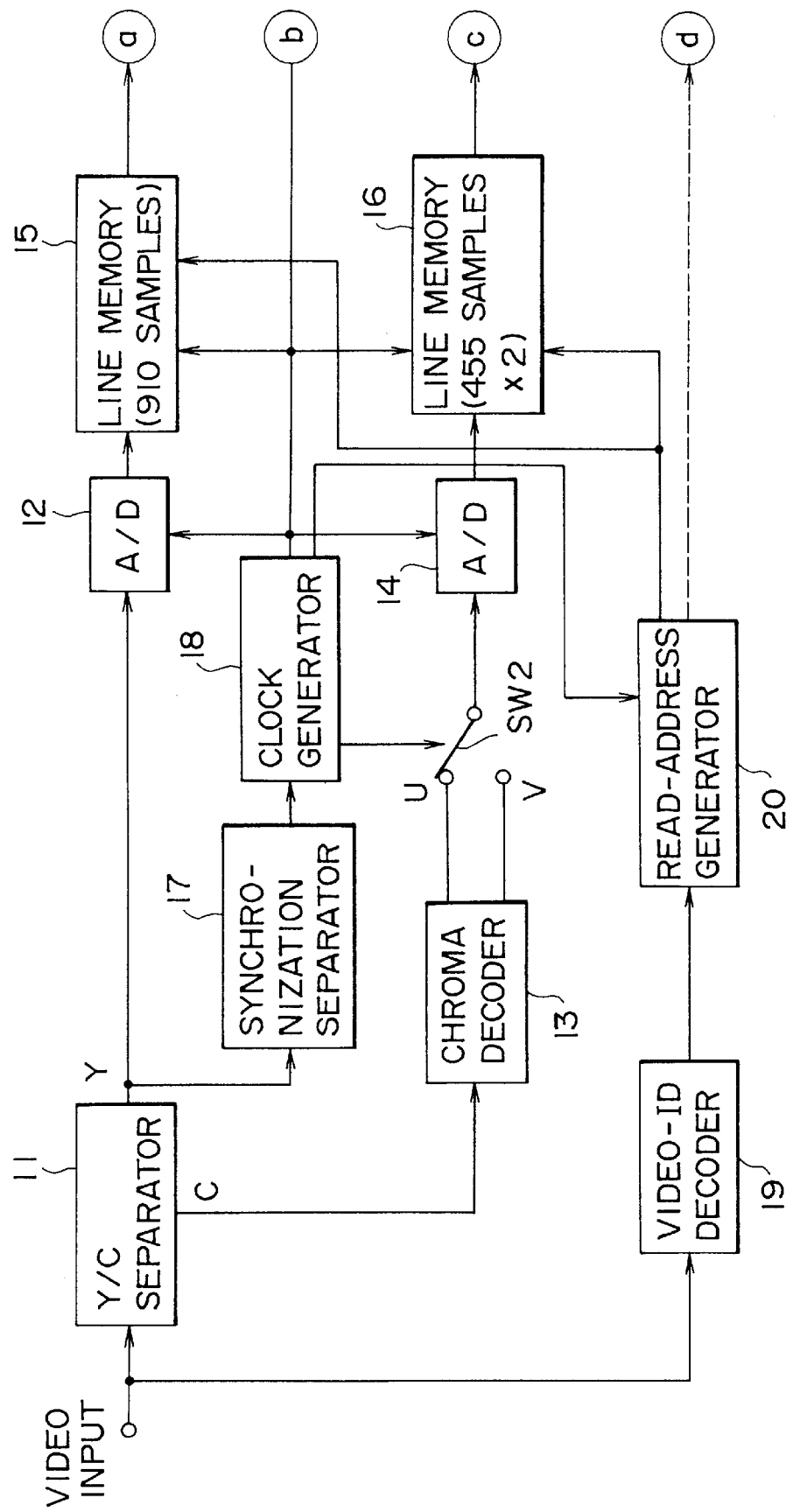

The aspect converter 3 for converting the aspect ratio of the video signal now will be discussed with reference to FIGS. 3a and 3b. The video signal is input to the aspect converter 3 and is received by a Y/C separator 11. The Y/C separator 11 separates the video signal into a luminance signal Y and a chrominance signal C. The luminance signal Y is output from the Y/C separator to an analog-to-digital converter 12, which converts the analog luminance signal Y to a digital signal. The digitized luminance signal Y is then sampled at 910 samples per line and stored in a line memory 15.

The chrominance signal C is output from the Y/C separator 11 to a chroma decoder 13 which decodes the chrominance signal C into color difference signals U and V and supplies the color difference signals U and V, via switch SW2 to an analog-to-digital convertor 14. The digitized color difference signals are then output to a line memory 16 where they are stored at 455 samples per line.

The luminance signal Y is also supplied to a synchronization separator 17, which derives a synchronization signal from, for example, the horizontal sync signal included in the luminance signal. The synchronization signal is employed by a clock generator 18 to synchronize the operations of analog-to-digital converters 12, 14, line memories 15 and 16, and the switch SW2. The latter being switched between terminals U and V, which correspond to the color difference signals U and V, on a time-division basis.

The line memory 16 actually is supplied with 910 samples per line; but, since the switch SW2 switches between the U and V color difference signals on a time-division basis, the line memory circuit 16 stores 455 samples of the U color difference signals and 455 samples of the V color difference signals for a total of 910 samples (as shown in FIG. 4). Thus, the luminance signal Y is sampled 910 times per line, the U color difference signal is sampled 455 samples per line and the V color difference signal is sampled 455 samples per line. The ratio between the Y:U:V signals is, therefore, 4:2:2 (910:455:455) and the resulting video picture constructed from the samples is known as a 4:2:2 video picture.

The input video signal thus stored as a digital video picture in line memories 15 and 16 is ready for aspect ratio conversion. Since the digital video picture is simply the input video picture stored digitally, the digital video picture has the same aspect ratio as the input video signal. The aspect ratio of the stored digital video picture is converted in the present invention by outputting a partial area of the digital video picture from line memories 15 and 16 with the desired aspect ratio. That is, the partial area is a portion "cut" from the input video signal and, therefore, has a different aspect ratio.

The aspect ratio and the position of the partial area are derived from the identification signal. A video-ID decoder 19 decodes the identification signal included in the input video signal and extracts the partial area information. The partial area information corresponds to that portion of the video picture which an author, editor, director or other creators of the video picture has designated as being the most essential portion of the picture. For example, an actor may be on the left side of a wide-screen video picture, so that the author may designate the left side as being the most essential area of the video picture. The video-ID decoder 19 then outputs the partial area information to a read-address generator 20 which supplies addresses corresponding to the partial area information to the line memory circuits 15 and 16. The line memory circuits then read out those samples stored at such addresses, which constitute the partial area having the appropriate output aspect ratio. In this manner, the aspect ratio of the input video signal is converted to the desired output aspect ratio.

The samples comprising this partial area are then output to a luminance signal interpolating circuit 21 and a U/V signal interpolating circuit 22 which are synchronized by the clock generator 18 and reconstruct the video signal with the output aspect ratio from the samples stored in the line memory circuits 15 and 16. The reconstructed luminance signal is then applies to a digital-to-analog converter 23 and is converted back into an analog signal and, similarly, the reconstructed U/V difference signals are applied to a digital-to-analog converter 24 and converted back into an analog signal. The analog luminance signal Y is combined in a mixing, or adding circuit 25 with the rewritten identification signal which is output from a video-ID encoder 26; and the analog color difference signals U/V are coupled by a switch SW3, which is alternately switched by the read-address generator 20 in order to produce separate color difference signals U and V, to a chroma encoder 28 which encodes the color difference signals U and V into a chrominance signal C. An adder 27 combines the luminance signal Y (along with the rewritten ID signal) and the chrominance signal C and supplies the resulting video signal having the output aspect ratio to the television (not shown).

An example of aspect ratio conversion will be discussed with reference to FIGS. 5a–5d, 6a–6c and 7. FIGS. 5a–5c each shows an output video picture with a 4:3 aspect ratio, and FIG. 5d depicts an input video picture with a 16:9 aspect ratio. The video picture in FIG. 5d with the 16:9 aspect ratio is input to the aspect converter 3 of FIG. 1 and stored as a digital video picture in line memories 15 and 16 of FIG. 3a, as discussed above. The video-ID decoder 19 decodes the identification signal from the video signal and retrieves the partial area information. As mentioned previously, the partial area information indicates which portion of the 16:9 video picture will be output as the 4:3 video picture. For example, the partial area information may designate the left portion shown in FIG. 5a as the most essential portion of the wider 16:9 video picture. The partial area information is coupled to the read-address generator 20, which generates addresses corresponding to the left portion of the 16:9 video picture, and stored samples which constitute the left portion are read out.

An example of the memory area corresponding to the left portion of the 16:9 video picture is shown in FIG. 6a. As shown, a write address of the left portion ranges from sample 1 to sample 910 of a horizontal line and the time period constituted by these samples represents 63.5 micro seconds. The read address of the left side portion ranges from sample 1 to sample 682 and, likewise, the time period constituted by these read addresses represents 63.5 micro seconds. The dashed and solid lines in the right portion of FIG. 6a indicate the write and read operations which are repeated every 63.5 micro seconds. On the other hand, if the middle portion of the 16:9 video picture is designated as the partial area, as shown in FIG. 5b, the read addresses range from sample 114 to sample 796, as shown in FIG. 6b. If, however, the right portion of the 16:9 video picture is designated as the partial area, as shown in FIG. 5c, the read addresses range from sample 228 to sample 910. While the foregoing has exemplified specific areas (i.e., the left, middle and right areas) of the 16:9 video picture, it is recognized that the present invention can designate any portion of the 16:9 video picture as the partial area.

By designating the partial area of the 16:9 video picture in this manner, an author, editor, director or other creator of a movie, can designate which portion of the video signal is the most essential. Thus, the converted video picture retains the essential video information and the quality of the program viewed is not diminished.

Once the partial area of the 16:9 digital video picture is designated by the read-address generator 20, the line memories 15, 16 read out the appropriate portion of the video picture to the interpolating circuits 21 and 22 which interpolate the digitally stored luminance and color difference samples, respectively, of the video picture.

The samples stored in the line memories 15 and 16 are representative values of the entire set of pixels making up the video picture. Therefore, the pixels which were not sampled are reconstructed from the pixels which were sampled when reconstructing the video picture. One technique for reconstructing the video picture is to interpolate the unsampled pixels from the sampled pixels by estimating the values of the unsampled pixels from neighboring sampled pixels. When each of the unsampled pixels is interpolated, the video picture is reconstructed and may be output to a television screen.

Figure 7:
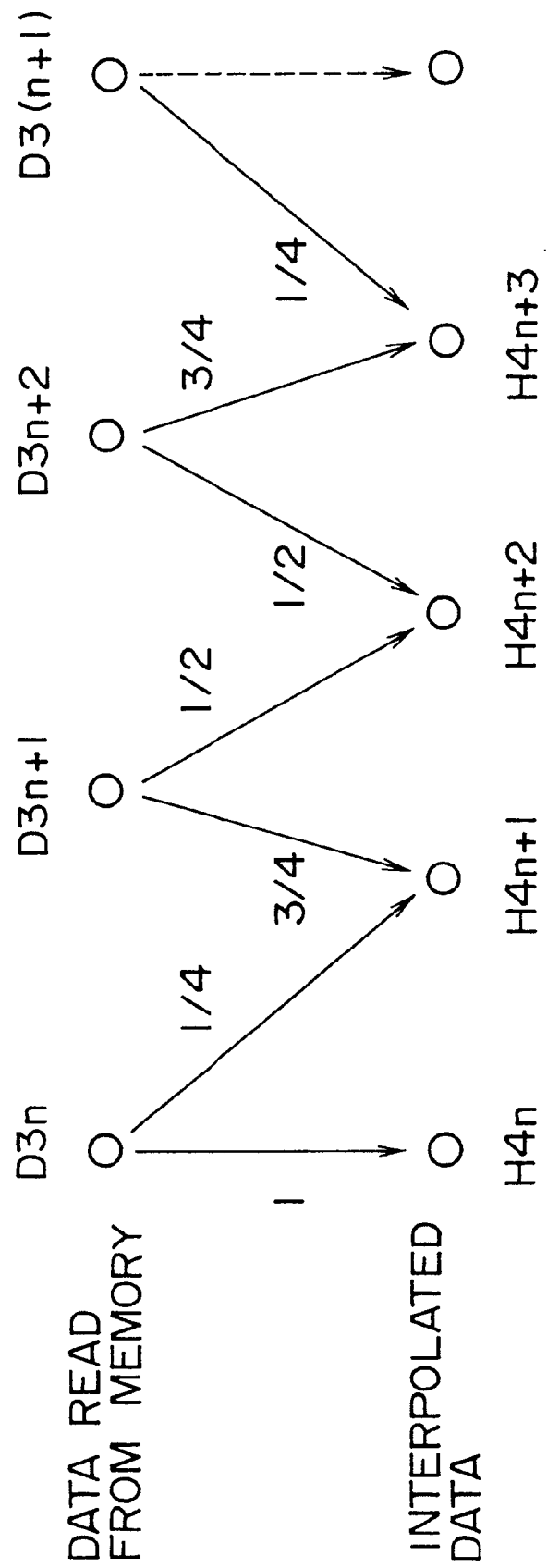
FIG. 7 is a diagram showing interpolation processing.

A preferred interpolation process carried out by the interpolating circuits 21 and 22 is shown in FIG. 7. As illustrated, three samples of data, designated $D_{3n}$ are read out from a line memory unit and are converted into four samples of interpolated data designated $H_{4n}$. The next four interpolated data samples, designated $H_{4n+1}$, are generated by factoring (or multiplying) the first three read out data samples $D_{3n}$ by ¼, factoring (or multiplying) the next three read out data samples $D_{3n+1}$ by ¾, and adding the factored products. The next four (or middle) interpolated data samples $H_{4n+2}$ are generated by factoring the three read out data samples $D_{3n+1}$ by ½, factoring the next three data samples $D_{3n+2}$ by ½, and adding the factored products. The last four interpolated data samples $H_{4n+3}$ are generated by factoring the three read out data samples $D_{3n+2}$ by ¾, factoring the next set of three read out data samples $D_{3(n+1)}$ by ¼ and adding the factored products. The interpolation described above and represented in FIG. 7 is described by the following equations:

$$H_{4n} = D_{3n}$$
$$H_{4n+1} = (1/4)D_{3n} + (3/4)D_{3n+1}$$
$$H_{4n+2} = (1/2)D_{3n+1} + (1/2)D_{3n+2}$$
$$H_{4n+3} = (3/4)D_{3n+2} + (1/4)D_{3(n+1)}$$

While the preferred embodiment employs the above-described process of interpolation, it will be appreciated that any suitable interpolation process can be used.

The interpolated luminance signal Y and the interpolated U/V signals, which are produced in the manner depicted in FIG. 7, are supplied to D/A converters 23, 24, respectively, in FIG. 3b. In the manner described above, the analog interpolated luminance signal Y is combined with the rewritten identification signal by adder 25; and the analog interpolated U/V signal, after being alternately switched by switch SW3 to chroma encoder 28 to regenerate the chrominance signal C, is combined with the luminance signal by adder 27. Hence, the aspect conversion is complete.

The above example describes converting an aspect ratio of a 16:9 video picture to a 4:3 television picture. However, the present invention is not limited to converting a 4:3 video picture to a 16:9 video picture and can be applied to convert any aspect ratio. In the case of displaying a 4:3 video picture on a 16:9 wide-screen television, for example, the input video signal is processed in generally the same manner as described above. However, the partial area is designated in the vertical direction in this case instead of in the horizontal direction. Since the 4:3 video picture contains more vertical lines than the 16:9 television screen (FIG. 17e), the partial area must be enlarged in the horizontal direction. The partial area is enlarged also in the vertical direction to prevent the video picture from appearing "squashed", and the ends extending in the vertical direction outside the screen are cut off. A field memory unit (not shown) in a vertical-direction interpolation circuit (not shown) may be used to enlarge the partial area in the vertical-line direction so that the partial area fills up the 16:9 wide-screen television without distortion.

Figure 8:
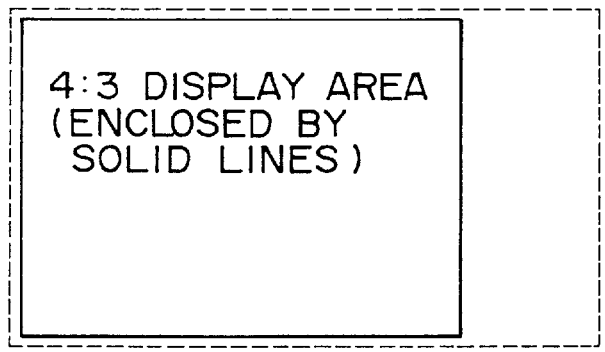
FIG. 8 is a diagram specifying a partial area selected in the horizontal direction of a picture for the case of displaying a 16:9 wide-screen picture on a 4:3 television screen.
Figure 9:
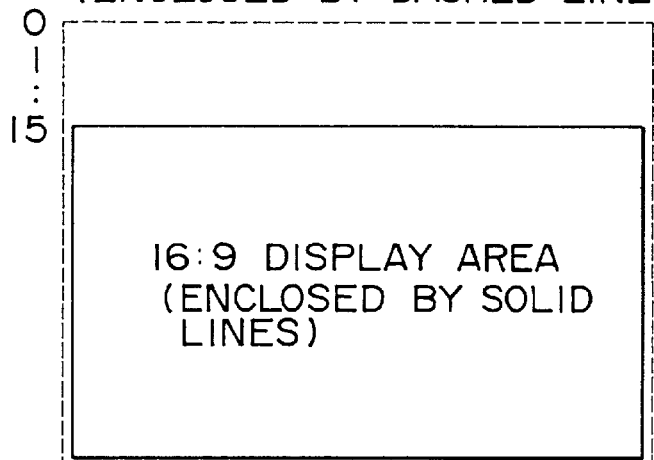
FIG. 9 is a diagram showing a partial area selected in the vertical direction for the case of displaying a 16:9 wide-screen picture on a 4:3 television.

The manner of specifying a partial area of an input video picture to be displayed as the output video signal will now be described with reference to FIGS. 8–10. In FIG. 8, the partial area is selected in the horizontal direction for the case where a 16:9 video picture is displayed on a 4:3 television. The horizontal position of the partial area to be displayed can be represented by a 4-bit value which ranges from 0 to 15 to indicate the starting position of the partial area to be displayed. Here, the starting position is the upper-left corner of the partial area. For example, the partial area shown in FIG. 5a may be represented by the value 0000 because the starting position of the partial area starts at the beginning of the 16:9 video picture (similarly, the partial areas shown in FIGS. 5b and 5c may be represented by the binary values 0110, 1000, 1111, etc.).

A similar method may be used to specify the position of the partial area in the vertical direction, such as when displaying a 4:3 video picture on a 16:9 television screen. As shown in FIG. 9, the partial area is the 16:9 area indicated by the solid black line and is positioned within the dashed line indicating the 4:3 input video picture. As in the case of displaying a 16:9 video picture on a 4:3 television, the starting vertical point of the partial area in FIG. 9 can be represented by a 4-bit value ranging from 0 to 15, which indicates the distance from the upper end of the input picture to the start position of the partial area.

Figure 10:
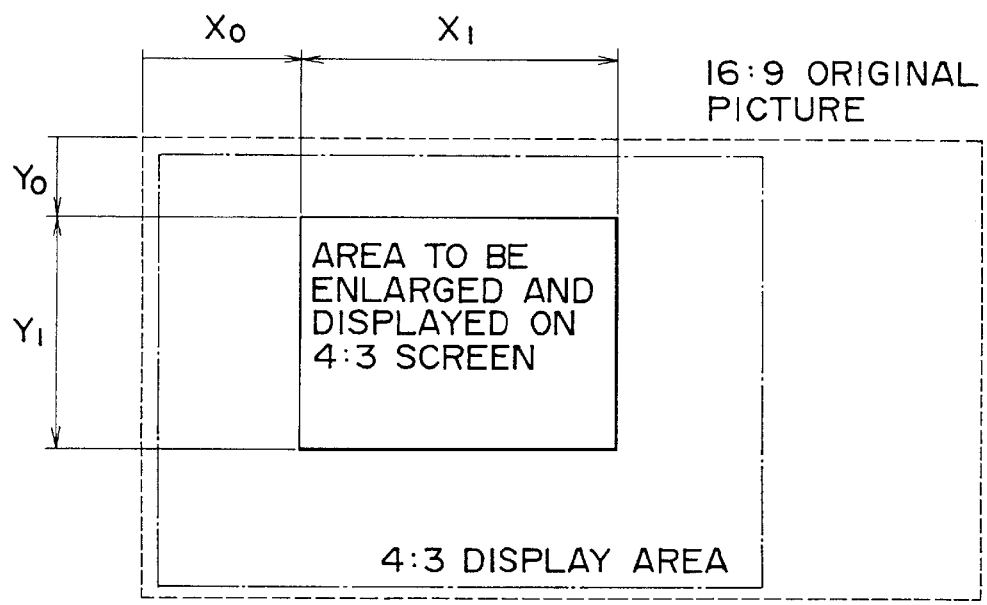
FIG. 10 is a diagram specifying the position of an arbitrary partial area of a wide-screen image source, which partial area is to be enlarged in the horizontal and vertical directions on a 4:3 television display.

The partial area may be offset by both a horizontal and a vertical distance as shown in FIG. 10. In this case, the position of the partial area is expressed by a pair of coordinates X and Y, which correspond to the starting horizontal and vertical positions, respectively. The start position, for example, may be expressed as $(X_0, Y_0)$ which corresponds to the upper left corner of the partial area. The end position corresponding to the lower-right corner of the partial area may be expressed as $(X_1, Y_1)$. As before, a digital value is used to represent the coordinates $(X_0, Y_0)$, $(X_1, Y_1)$. While the above methods of specifying a partial area give specific values for the positions, any values may be used depending upon the position of the partial area.

Figure 11:
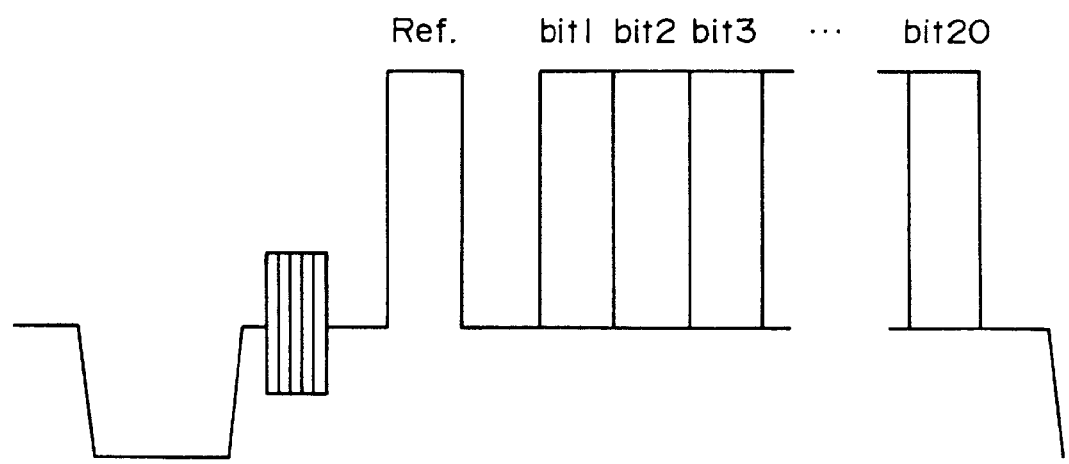
FIG. 11 is a diagram showing the configuration of an identification signal used in an embodiment of the present invention.
Figure 12:
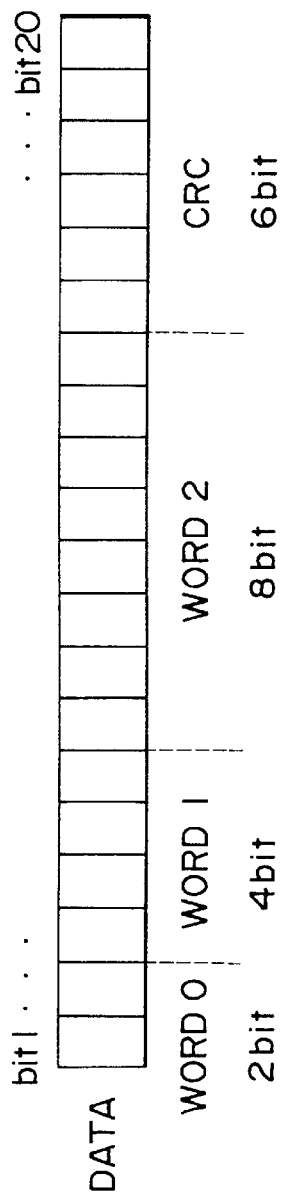
FIGS. 12a to 12c are diagrams showing the bit assignment of a 20-bit identification code of the identification signal shown in FIG. 11.

The preferred embodiment of the present invention processes digital signals. Examples of bit allocations of the digital signals will now be discussed with reference to FIGS. 11–15. FIG. 11 represents the identification signal transmitted during the vertical blanking interval of the input video signal. The identification signal is comprised of a reference pulse followed by 20 bits of information. The reference pulse indicates that an identification signal is present and the video-ID decoder 19 (FIG. 3a) is alerted that an identification signal is forthcoming. The 20 bits following the reference pulse represent information about the input video signal including the partial area information.

Figure 16C:
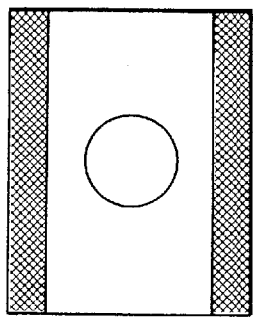
FIGS. 16a to 16d are diagrams showing a wide picture transmitted in the letter-box format to be displayed in a 4:3 or 16:9 wide television.
Figure 16D:
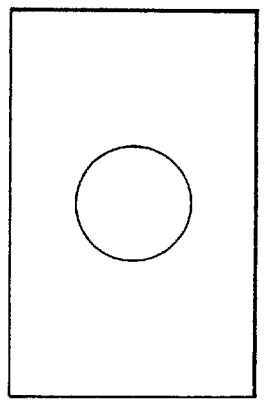
Figure 16B:
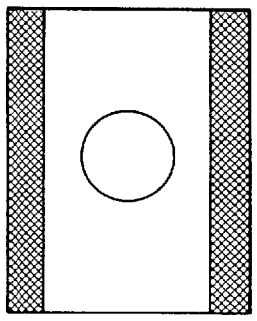
Figure 16A:
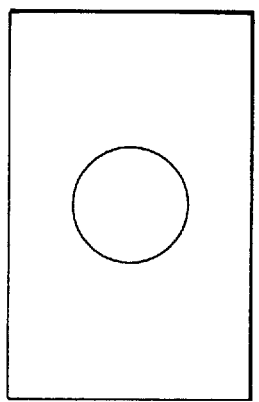
Figure 18C:
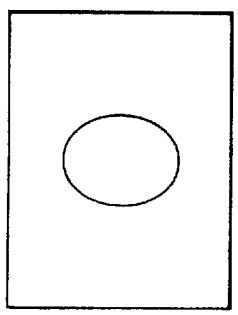
FIGS. 18a to 18d are diagrams showing a transmitted 16:9 wide-screen image source to be displayed on a 4:3 or 16:9 wide-screen television.
Figure 18D:
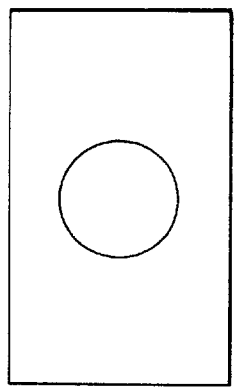
Figure 18B:
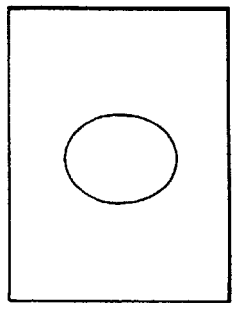
Figure 18A:
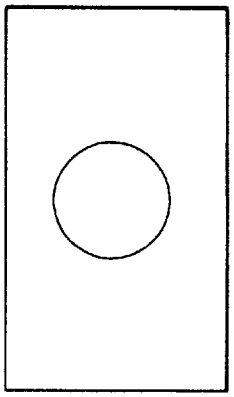

FIG. 12a illustrates one example of a bit allocation map of the 20 bits of the identification signal. The first 2 bits are allocated to WORD 0 and indicate the transmitted aspect ratio and the picture display format, respectively. As shown in FIG. 12b, when bit 1 of WORD 0 exhibits a binary value "1", the transmitted aspect ratio is 16:9. When bit 1 is set to the value "0", on the other hand, the transmitted aspect ratio is 4:3. When bit 2 is set to the value "1", the picture display format is the letter box format (see FIG. 16c), and when bit 2 is set to the value "0", the picture display format is a normal format. Thus, the present invention determines the transmitted aspect ratio and the picture display format from WORD 0 of the identification signal.

Bits 3 to 6 are allocated to WORD 1 and define the contents transmitted in WORD 2. As shown in FIG. 12c, WORD 1 has 16 different definitions for WORD 2. In the case where WORD 1 has a value of 0100, WORD 2 is defined as the partial area information.

As shown in FIG. 13, bits 7 to 10 represent a horizontal-direction position and bits 11 to 14 represent a vertical-direction position of the partial area. As discussed above, the 4-bit data of bits 7 to 10 are encoded to describe the position of the partial area along the horizontal axis when a 4:3 input video picture is converted to a 16:9 television picture. Similarly, the 4-bit data of bits 11 to 14 represent the position of the partial area along the vertical axis when a 16:9 input video picture is converted to a 4:3 television picture. In the case where both the horizontal and vertical position of the partial area is represented by a pair of coordinates (X, Y) as in FIG. 10, both the horizontal-direction position bits 7 to 10 and the vertical-direction position bits 11 to 14 are used.

The present invention is not limited to the above-described bit allocation, but may employ other bit allocations. FIG. 14, for example, shows WORD 2 with an alternative bit allocation. In that figure, bit 7 is not defined, bit 8 defines a scene size, bits 9 and 10 define the caption position of the video picture and bits 11 to 14 define the horizontal and vertical-direction positions.

When a 16:9 video picture is to be displayed on a 4:3 television screen, the partial area in the 16:9 picture is enlarged in both the horizontal and vertical directions; and, the bit allocation shown in FIG. 15 may be employed. As shown, bit 7 indicates whether bits 8 to 14 correspond to the horizontal or vertical direction. Bits 8 to 10 indicate the end position of the partial area ($X_1$, $Y_1$) as seen in FIG. 10, and bits 11 to 14 indicate the beginning position of the partial area ($X_0$, $Y_0$). The partial area is enlarged in both the horizontal and vertical directions so that the partial area fills the entire 4:3 television screen without distortion.

With the above-described invention, an input video picture can be displayed on a television display screen even when the aspect ratios of the input picture and the television display do not coincide. The video picture resulting from the present invention is not vertically stretched or deformed as is the case with conventional technology. In the present invention, a partial area of the original picture, that is, the area containing an essential portion of the picture, is selected, and that portion of the input video picture is preserved after aspect conversion. Thus, image quality and integrity are preserved in the present invention. Moreover, the resulting video picture of the present invention does not include blank portions, which are considered visually unappealing. The present invention also is usable with television displays that are equipped with an aspect conversion function of the conventional art by rewriting the identification signal to alert such televisions that the input video picture has already been converted.

While the present invention has been described using certain examples of aspect ratios, this invention is not limited to any particular aspect ratio, but may be employed to convert any aspect ratio; and numerous modifications and variations of the present invention are contemplated. Also, the above disclosure indicates that the output video signal is supplied directly to a television. However, the present invention can output the converted video signal to any other device, such as a video recorder or a transmitter. It is, therefore, to be understood that within the scope of the appended claims, the invention may be practiced otherwise than as specifically described herein.

We claim:

1. Apparatus for converting an input video picture having an input aspect ratio, represented by an input video signal which contains partial area information representing a partial area manually selected by an editor as the most essential portion of said input video picture, into a converted video picture with a converted aspect ratio corresponding to a receiver aspect ratio of a television receiver, said apparatus comprising:

decoder means for decoding said partial area information from said input video signal;

addressable memory means for storing samples of said input video signal;

read address generator means responsive to the decoded partial area information for generating addresses representing those locations in said addressable memory means in which are stored the samples constituting said partial area manually selected by an editor as the most essential portion of said input video picture so as to read out said partial area samples; and processing means for detecting said input aspect ratio of said input video picture and said receiver aspect ratio, for selecting a mode of aspect ratio conversion based on the detected input aspect ratio of said input video picture and said receiver aspect ratio, and for converting said partial area samples to said converted video picture with said converted aspect ratio in accordance with the mode of aspect ratio conversion selected such that the most essential portion of said input video picture manually selected by said editor is not cut-off in the converted video picture.

2. The apparatus of claim 1, wherein said input video signal contains an ID signal indicating the input aspect ratio of said input video signal; and further comprising a microcomputer responsive to said ID signal for selectively controlling the production of said converted video signal with said converted aspect ratio.

3. The apparatus of claim 2, further comprising an aspect-conversion switch coupled to the microcomputer for disabling the production of said converted video signal with said converted aspect ratio.

4. The apparatus of claim 1, wherein said processing means includes means for rewriting an identification signal into said converted video signal to indicate that the aspect ratio of said input video signal has been converted.

5. The apparatus of claim 1, further comprising Y/C separator means for separating the input video signal into a luminance signal and a chrominance signal; and means for supplying samples of the luminance and chrominance signals to said addressable memory means.

6. The apparatus of claim 5, wherein said means for supplying samples includes chroma decoder means connected to the Y/C separator means for separating the chrominance signal into color difference signals U and V and for supplying U samples and V samples to said addressable memory means.

7. The apparatus of claim 6, wherein said addressable memory means comprises a luminance memory for storing samples of said luminance signal one line at a time; and a chrominance memory for storing samples of said color difference signals U and V one line at a time.

8. The apparatus of claim 7, wherein said means for supplying samples further includes switch means for switching between the color difference signals U and V and alternately outputting the color difference signals U and V to the chrominance memory so that the luminance samples stored in the luminance memory exhibit a ratio 4:2:2 to the color difference samples U and V stored in the chrominance memory.

9. The apparatus of claim 8, wherein said processing means includes luminance signal interpolating means for receiving and interpolating the luminance samples read from the luminance memory; and U/V signal interpolating means for receiving and interpolating the color difference samples U and V read from the chrominance memory.

10. The apparatus of claim 9, wherein said processing means further includes chroma encoder means for recombining the interpolated color difference signals U and V output from the U/V signal interpolating means.

11. A method of converting an input video picture having an input aspect ratio, represented by an input video signal which contains partial area information representing a partial area manually selected by an editor as the most essential portion of said input video picture, into a converted video picture with a converted aspect ratio corresponding to a receiver aspect ratio of a television receiver, comprising the steps of:

storing samples of said input video signal;

reading out only those stored samples included in said partial area;

detecting said input aspect ratio of said input video picture and said receiver aspect ratio;

selecting a mode of aspect ratio conversion based on the detected input aspect ratio of said input video picture and said receiver aspect ratio; and converting the read out samples in accordance with said mode of aspect ratio conversion to produce output video samples representative of said converted video picture with said converted aspect ratio such that the most essential portion of said video picture manually selected by said editor is not cut-off in the converted video picture.

12. The apparatus of claim 1, wherein said converted video picture is displayable on a television screen of said television receiver having horizontal and vertical orientations, wherein said processing means enlarges the partial area samples in both said horizontal and vertical orientations such that said converted video picture fills the entire television screen without distortion.

13. The method of claim 11, wherein said converted video picture is displayable on a television screen of said television receiver having horizontal and vertical orientations, wherein said step of converting enlarges said read out samples in both said horizontal and vertical orientations such that said converted video picture fills the entire television screen without distortion.

14. The apparatus of claim 1, wherein said partial area is smaller than both said input video picture and said converted video picture.

15. The method of claim 11, wherein said partial area is smaller than both said input video picture and said converted video picture.

16. The apparatus of claim 1, wherein said processing means selects the mode of aspect ratio conversion including a first mode of aspect ratio conversion for converting a wide-screen video picture having vertical borders to a standard-screen video picture by selecting as said partial area a display area extended to the vertical borders of the wide-screen video picture and extended to a point along the horizontal of the wide-screen video picture, a second mode of aspect ratio conversion for converting a standard-screen video picture having both horizontal borders and a vertical border to a wide-screen video picture by selecting as said partial area said display area extended to the horizontal borders of the standard-screen video picture and extending to a point along the vertical border of the standard-screen video picture, and a third mode of aspect conversion for converting the wide-screen video picture to the standard-screen video picture by selecting as said partial area said display area at an arbitrary position circumscribed by the borders of the wide-screen video picture and enlarged proportionally to said converted aspect ratio, wherein said processing means selects one of said first, second and third modes of aspect ratio conversion which eliminates vertical distortion of the converted video picture based on the detected input aspect ratio of said input video picture and the receiver aspect ratio.

17. The method of claim 11, wherein said step of selecting selects the mode of aspect ratio conversion including a first mode of aspect conversion for converting a wide-screen video picture having vertical borders to a standard screen video picture by selecting as said partial area a display area extended to the vertical borders of the wide-screen video picture and extended to a point along the horizontal of the wide-screen video picture, a second mode of aspect ratio conversion for converting a standard-screen video picture having both horizontal borders and a vertical border to a wide-screen video picture by selecting as said partial area said display area extended to the horizontal borders of the standard-screen video picture and extending to a point along the vertical border of the standard-screen video picture, and a third mode of aspect conversion for converting the wide-screen video picture to the standard-screen video picture by selecting as said partial area said display area at an arbitrary position circumscribed by the borders of the wide-screen video picture and enlarged proportionally to said converted aspect ratio, wherein said step of selecting selects one of said first, second and third modes of aspect ratio conversion which eliminates vertical distortion of the converted video picture based on the detected input aspect ratio of said input video picture and the receiver aspect ratio.

* * * * *